Oct. 12, 1948.  R. G. LE TOURNEAU  2,450,972
OPERATING MECHANISM FOR LATHES

Filed June 10, 1946  2 Sheets-Sheet 1

INVENTOR.
R. G. LeTourneau
BY
*[signature]*
ATTYS

Oct. 12, 1948.  R. G. LE TOURNEAU  2,450,972
OPERATING MECHANISM FOR LATHES
Filed June 10, 1946  2 Sheets-Sheet 2
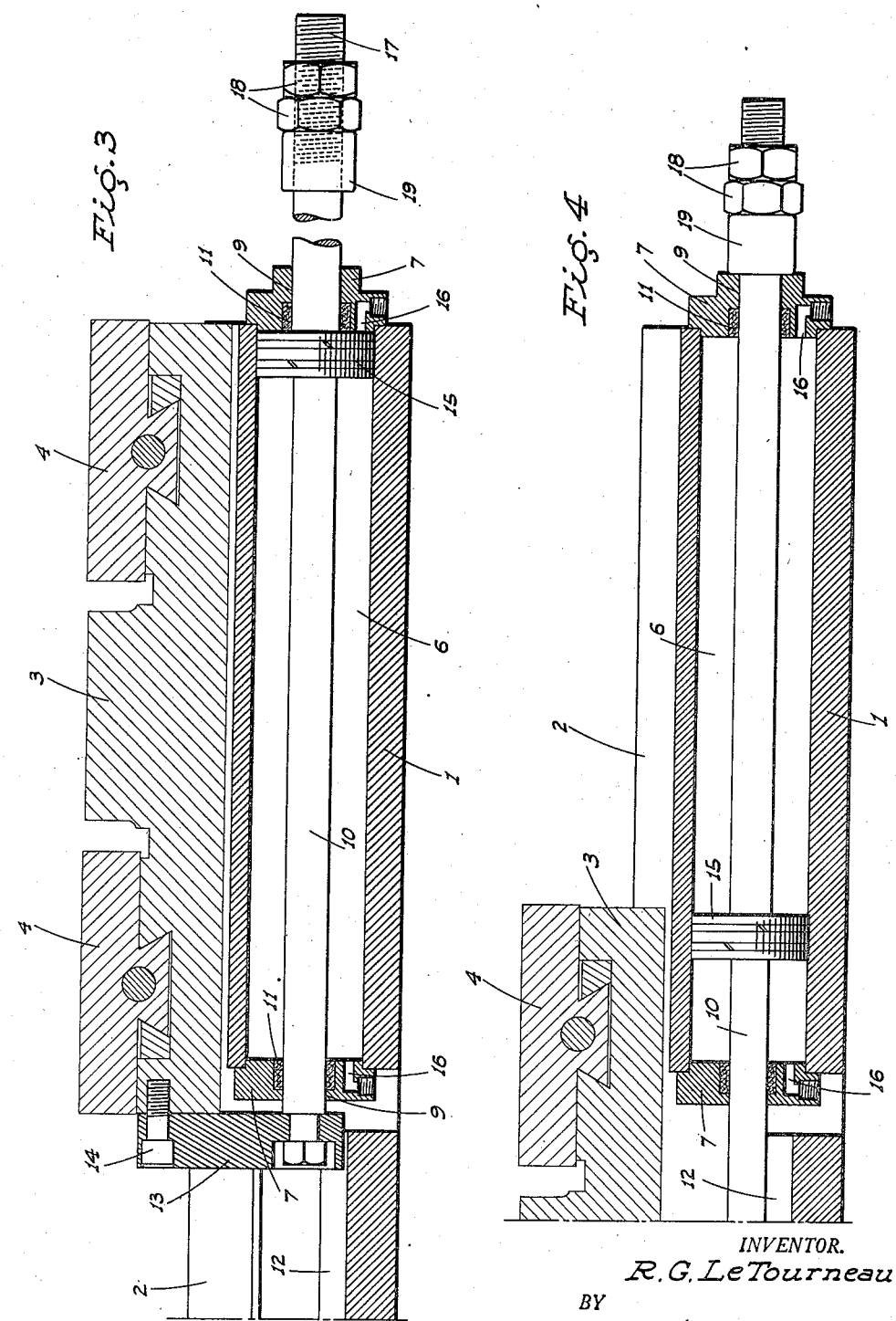
INVENTOR.
R. G. LeTourneau
BY
ATTYS Patented Oct. 12, 1948

2,450,972

UNITED STATES PATENT OFFICE 2,450,972

OPERATING MECHANISM FOR LATHES

Robert G. Le Tourneau, Peoria, Ill., assignor to R. G. Le Tourneau, Inc., Stockton, Calif., a corporation of California Application June 10, 1946, Serial No. 675,632

1 Claim. (Cl. 82—32)

The present invention is directed to an improved operating mechanism for lathes, and in particular it is an object to provide a novel mechanism for power advancing or retracting a lathe carriage.

Another object of the invention is to provide a lathe carriage operating mechanism, as above, wherein the power means is a fluid pressure actuated power cylinder unit disposed between the ways of the lathe; the cylinder being bored directly in the bed of the lathe longitudinally thereof, and the piston rod of said unit being connected to the lathe carriage.

The advantages of the mechanism as in the preceding paragraph, reside in the fact that the cylinder unit is out of the way of the position and motion path of all other parts on the lathe, and effectively imparts accurate longitudinal movement to the carriage without binding transversely on the ways.

A further object of the invention is to provide a novel and adjustable stop assembly on the lathe arranged to mechanically, positively, and accurately limit advance of the carriage and supported tool to a predetermined extent; such stop assembly being mounted in connection with the end of the piston rod of the power cylinder unit opposite the end thereof which is connected to the carriage.

It is also an object to provide an operating mechanism for lathes, as described, which is especially adaptable to heavy duty machines, yet is simple and eliminates the substantial mounting means and reinforcement which would be necessary were the cylinder an initially separate member.

A further object of the invention is to provide a practical operating mechanism for lathes, and one which will be effective for the purpose for which it is designed.

These objects are accomplished by means of such structure and relative arrangement of parts as will fully appear by a perusal of the following specification and claim.

In the drawings:

Fig. 3 is a fragmentary longitudinal sectional elevation showing the power cylinder unit as formed in the bed of the lathe and as connected to the carriage; the piston of the cylinder unit, and the carriage, being shown in correspondingly retracted positions.

Fig. 4 is a view similar to Fig. 3 but shows the piston of the cylinder unit, and the carriage, in correspondingly advanced positions.

Figure 1:
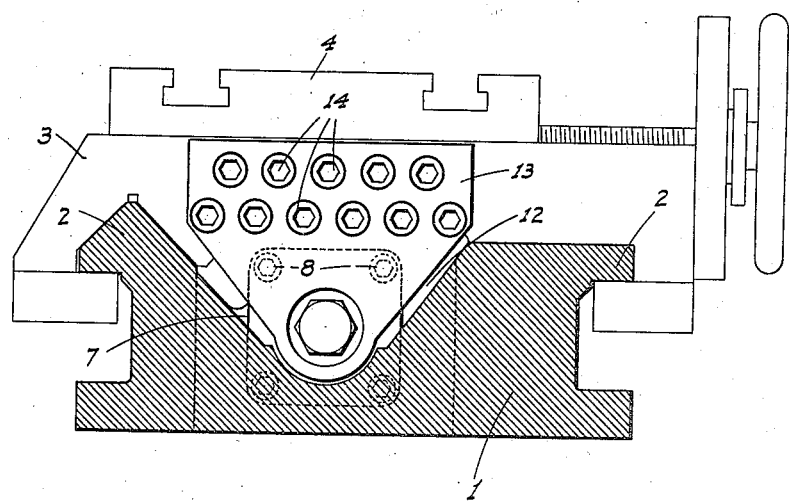
Fig. 1 is a cross section through the lathe bed ahead of the carriage, and power cylinder unit.
Figure 2:
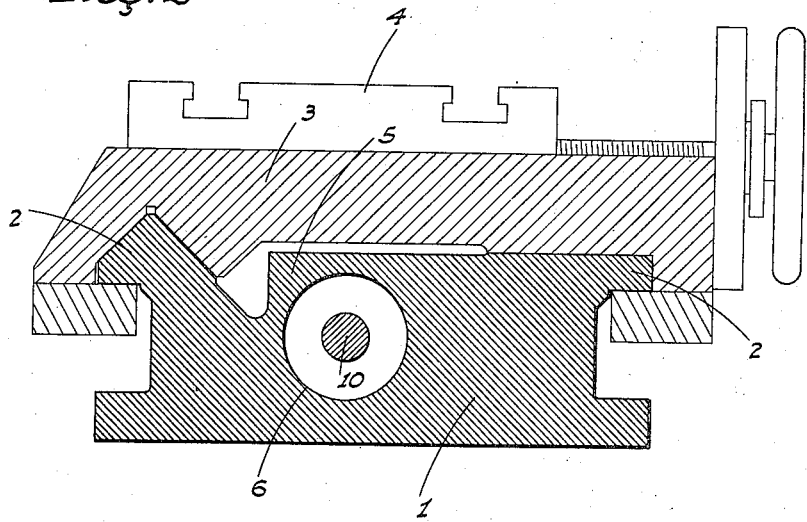
Fig. 2 is a cross section through the bed in the portion thereof in which the cylinder is formed.

Referring now more particularly to the characters of reference on the drawings, the numeral 1 indicates the bed of a lathe formed as usual with ways 2, on which a carriage 3 is slidable lengthwise of said bed; the carriage 3 being fitted with a cross slide 4 to which the tool or tool holder is adapted to be secured.

Adjacent one end of the bed 1 the latter is formed with an enlarged portion 5 between the ways 2, and a longitudinal cylinder 6 is bored in said enlarged portion 5, as shown.

The cylinder 6 is fitted, at opposite ends, with end heads 7 secured in place by cap screws 8; each such head 7 being provided with a central bore 9. A piston rod 10 extends axially through the cylinder 6 and projects beyond opposite ends thereof through corresponding bores 9; there being seals 11 in each bore 9 in close surrounding relation to the piston rod.

Beyond the forward end of the cylinder 6 the bed 1 includes a V-trough 12 into which the adjacent end of the piston rod 10 extends. On said adjacent end the piston rod 10 is fitted with a radially upstanding connector plate 13 which is secured by attachment screws 14 in abutting relation to the forward end of the carriage 3.

Within the cylinder 6 the piston rod 10 is fitted with a piston 15; said piston being disposed on said rod at a point such that when the piston is retracted, as in Fig. 3, the carriage 3 is correspondingly retracted. Similarly when the piston is advanced, as in Fig. 4, the carriage is likewise advanced.

The described power cylinder unit is double-acting so that the carriage may be power advanced or retracted, selectively, by the operator, or automatically, through the medium of a valve controlled fluid pressure system (not shown). Such fluid pressure system includes ducts 16 in the end heads 7, and through which ducts fluid pressure is fed to, or discharged from, the power cylinder unit, depending on the direction of motion of the piston 15.

At the end opposite the connector plate 13, i. e. at the outer end of the cylinder unit, the piston rod 10 is threaded, as at 17, and a pair of lock nuts 18 are adjustably threaded onto said portion 17 of the piston rod. Between the lock nuts 18 and the adjacent end head 7 the piston rod 10 is surrounded by a motion limiting sleeve 19. It will be seen that dependent upon the length of the motion limiting sleeve 19, and the adjusted position of the lock nuts 18, the extent of advance of the piston rod 10 and the connected carriage may be effectively and accurately controlled.

The motion limiting sleeve 19 is removable so that sleeves of different lengths may be placed on the piston rod 10, depending upon the extent of desired travel of the carriage 3. The lock nuts 18 are employed to give any exact adjustment which may be necessary in order to accurately limit carriage advance.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful and upon which Letters Patent are desired:

A lathe carriage operating means comprising a lathe bed, such bed consisting of a substantially solid metal block and including integral transversely spaced apart carriage ways, such bed being provided with a cylindrical bore adjacent one end of the bed, such bore being disposed below and between the ways, the bed being provided with an upwardly opening trough commencing at a point adjacent the inner end of the bore and extending toward the opposite end of the bed, said trough lying between the ways, a piston disposed for reciprocating movement within the bore, a piston rod on the piston projecting out of the bore and into the trough, and means on the outer end of the piston for connecting the same with a carriage riding the ways.

ROBERT G. LE TOURNEAU.

REFERENCES CITED

The following references are of record in the file of this patent:

UNITED STATES PATENTS

| Number | Name | Date |
|---|---|---|
| 1,240,032 | De Laval | Sept. 11, 1917 |
| 1,334,335 | Warren | Mar. 23, 1920 |
| 1,946,902 | Ferris | Feb. 13, 1934 |
| 2,122,204 | Gora | June 28, 1938 |
| 2,373,226 | Coates | Apr. 10, 1945 |
| 2,397,351 | Heintz | Mar. 26, 1946 |